US008455835B2

(12) United States Patent
Angell et al.

(10) Patent No.: US 8,455,835 B2
(45) Date of Patent: Jun. 4, 2013

(54) RADIATION DETECTION DEVICE

(76) Inventors: Daniel K. Angell, Allen Park, MI (US); Thomas K. Hunt, Ann Arbor, MI (US)

( * ) Notice: Subject to any disclaimer, the term of this patent is extended or adjusted under 35 U.S.C. 154(b) by 0 days.

(21) Appl. No.: 13/222,262

(22) Filed: Aug. 31, 2011

(65) Prior Publication Data

US 2011/0309254 A1     Dec. 22, 2011

Related U.S. Application Data

(62) Division of application No. 12/443,991, filed as application No. PCT/US2007/080372 on Oct. 4, 2007, now abandoned.

(60) Provisional application No. 60/849,306, filed on Oct. 4, 2006, provisional application No. 60/849,244, filed on Oct. 4, 2006.

(51) Int. Cl.
*G01T 1/20* (2006.01)

(52) U.S. Cl.
USPC .................. 250/363.1; 250/483.1; 250/486.1; 250/484.4; 250/368

(58) Field of Classification Search
USPC ......................................................... 250/368
See application file for complete search history.

(56) References Cited

U.S. PATENT DOCUMENTS

| | | | | |
|---|---|---|---|---|
| 5,313,065 A * | 5/1994 | Reed | ............................. | 250/368 |
| 5,334,843 A * | 8/1994 | Zeman | ....................... | 250/486.1 |
| 5,374,824 A * | 12/1994 | Chaney et al. | ........... | 250/363.02 |
| 5,519,227 A * | 5/1996 | Karellas | ....................... | 250/483.1 |
| 5,554,850 A * | 9/1996 | Hejazi | ............................ | 250/367 |
| 5,594,253 A * | 1/1997 | Bueno et al. | ................ | 250/486.1 |
| 5,818,056 A * | 10/1998 | Pass | .............................. | 250/458.1 |
| 5,952,665 A * | 9/1999 | Bhargava | .................... | 250/483.1 |
| 6,433,929 B1 * | 8/2002 | Sasaki | ............................ | 359/388 |
| 6,445,767 B1 * | 9/2002 | Karellas | ........................ | 378/98.8 |
| 6,452,184 B1 * | 9/2002 | Taskar et al. | ................... | 250/367 |
| 6,534,772 B1 * | 3/2003 | Chhabra et al. | ................ | 250/367 |
| 6,674,837 B1 * | 1/2004 | Taskar et al. | ................... | 378/122 |
| 7,662,083 B2 * | 2/2010 | Gueye et al. | ....................... | 600/7 |
| 7,787,933 B2 * | 8/2010 | Iwanczyk et al. | .............. | 600/425 |
| 2003/0163016 A1 * | 8/2003 | Testardi | ............................ | 600/2 |
| 2004/0200966 A1 * | 10/2004 | Ramsden | ....................... | 250/367 |
| 2006/0043299 A1 * | 3/2006 | Smith et al. | .............. | 250/339.07 |
| 2006/0178577 A1 * | 8/2006 | Iwanczyk et al. | .............. | 600/425 |
| 2009/0026375 A1 * | 1/2009 | Doshi | ............................ | 250/366 |

* cited by examiner

*Primary Examiner* — David Porta
*Assistant Examiner* — Djura Malevic
(74) *Attorney, Agent, or Firm* — Brinks Hofer Gilson & Lione (57) ABSTRACT

A radiation detection system for detecting the presence and location of a radiation source includes an optical fiber bundle having fibers of different lengths, a radiation sensitive material, a stimulating source and an optical detector. The stimulating source stimulates the radiation sensitive material and the radiation sensitive material releases a light output, while the light output provides a readout signal for each fiber corresponding in intensity to the radiation received from the radiation source. The optical detector receives the readout signal such that the variations in intensity of the readout signals along the length of the bundle determine the presence and general location of the radiation source.

9 Claims, 6 Drawing Sheets

RADIATION DETECTION DEVICE

CROSS REFERENCE TO RELATED APPLICATIONS

This application is a divisional of U.S. patent application Ser. No. 12/443,991, filed Dec. 8, 2009, now abandoned which claims benefit to PCT Application PCT/US07/080372 filed on Oct. 4, 2007,which claims benefit of U.S. Provisional Patent Application of 60/849,306, filed Oct. 4, 2006 and U.S. Provisional Patent Application 60/849,244 filed on Oct. 4, 2006, the entire contents of all are incorporated herein by reference.

BACKGROUND

1. Field of the Invention

The present invention generally relates to a radiation detection device. More specifically, the invention relates to optical fiber-based radiation detector arrays for monitoring nuclear radiation sources.

2. Description of Related Art

There is a growing concern that terrorists, or others, may attempt to import radioactive or nuclear material which may be used for the construction of nuclear and/or radiation based weapons. Because of this concern, these materials need to be either controlled or monitored. Because of the large number of containers transported in commerce, it is difficult to thoroughly check each and every container for the presence of any type of radioactive or nuclear material.

Therefore, it is desirable to be able to detect and identify the presence of nuclear radiation sources within packaging or containment that does not permit direct visual inspection. It is desirable to be able to do so with both high detection sensitivity and the ability to locate such radiation sources within the containment or packaging when immediate physical access to the interior of the packaging is not convenient or possible. It is further desirable to do this simply, rapidly, and without the necessity of large fixed facilities since, in the case of intermodal shipping containers, it will be important to detect any contraband before the container arrives in a destination port. It is further desirable, in addition to detecting the presence of nuclear radiating materials, to locate them in the object or objects being inspected. Such a radiation detection device may also be useful in Homeland security devices and/or automobile checkpoints.

Conventional detectors, which detect nuclear radiation in the forms of alpha, beta and gamma rays, are typically expensive, have limited sensitivity, are physically fragile, have limited life, making them unsuitable for widespread field deployment. Typical issues involve aspects such as the need to have active cooling in order to achieve high enough sensitivity with solid-state detectors, high power requirements supplied at mains (high) voltages as for traditional photomultiplier tube ("PMT") devices, and physically stable platforms on which the detectors can be mounted. Additionally it is, in many cases, necessary to collect the data and send the detection apparatus to a distant laboratory so that the read out of the data can be made in a thermally and light controlled environment not easily achieved 'in the field.' The time delay associated with remote processing can prevent prompt action on the results of the testing or monitoring, and that sometimes presents a serious problem.

Some radiation detectors comprise solid state materials which when interacting with gamma rays or high energy beta rays, produce electron-hole ("E-H") pairs internally. In particular types of material, the subsequent recombination of the E-H pairs produces light output which has a photon energy characteristic both of the material and the energy of the radiation which produced the E-H pairs, and which can be detected and measured. Typical materials include optically stimulated luminescent ("OSL") materials, such as carbon doped aluminum oxide ($\alpha$-$Al_2O_3$:C), $Al_2O_3$:Cr, Mg, Fe, $MgAl_2O_4$ spinels, $Mg_2SiO_4$:Tb, and natural fluorite, europium doped flourochlorozirconate glass ceramics, or alkali impurity doped BaFBr:$Eu^{+2}$ and thermal luminescent detector ("TLD") material types. Various examples of these materials can have ranges of times and temperatures over which the separated hole-electron pairs are stable. For these materials, when in their 'excited' state, the recombination can be stimulated to occur rapidly either by raising their temperature (TLD) so as to speed up migration of the electrons toward their nearby holes or by exposing them to an incident light flux (OSL) which can stimulate the recombination and consequent light emission. Furthermore, there are such materials having, in the absence of external stimulation, different excited state relaxation lifetimes and whose emissions upon recombination are characteristic and identifiable by their emission wavelengths. Additionally, there exist materials which are sensitive to the energy of the nuclear radiation and whose emission wavelength also depends on that energy.

In view of the above, it is apparent that there exists a need for an easily packaged, compact radiation detector device efficient in data readout and operable for long periods on low power. There further exists a need to be able to detect and identify the presence and location of nuclear radiation sources within packaging or containment that does not permit direct visual inspection. Additionally, this detection must be done simply, rapidly, and without the necessity of large fixed facilities since, in the case of intermodal shipping containers it will be important to detect any contraband before the container arrives in a destination port. Further, monitoring boundaries of nuclear facilities or of countries for covert transit of nuclear materials is also an important need.

SUMMARY

In satisfying the above need, as well as overcoming the enumerated drawbacks and other limitations of the related art, the present invention provides an improved, efficient, easily packaged, and compact radiation detection device. The present invention further provides an optical-fiber based radiation detection device for detection of both the presence and the location of the radiation source.

In one embodiment of the present invention, the radiation detector has a layered structure. The layered structure is created by deposition of successive layers comprising a light source, a radiation sensor, and an optical detector. The radiation sensor comprises a radiation sensitive material, such as an OSL material, which stores energy when it is exposed to a radiation source. It should be understood that throughout this summary and detailed description of this application, OSL material is interchangeable with TLD material. The OSL material releases the stored energy in the form of a light output in a characteristic wavelength range corresponding to the OSL material and in specific embodiments to the detected radiation source energy and in intensity to the amount of radiation it has received, in response to stimulation produced by activating the light source, such as a light emitting diode ("LED") source, a field emission display ("FED") source, an organic light emitting diode ("OLED") source, a vacuum tube fluorescent ("VFD") source, a light emitting plasma discharge tube or a laser, operating at a different wavelength than that of the light output. The light output provides a readout signal which is used to determine the energy of the radiation from the radiation source. An optical detector comprising an optical sensor element receives the readout signal and measures the intensity of the light output. An optical band-blocking filter is interposed between the radiation sensor and the optical detector for blocking the stimulating light energy provided by the stimulating light source from interacting with the optical detector.

In another embodiment, the wavelength of the stimulating light energy from the light source is in a longer wavelength range such as the infrared range while the wavelength of the light output is in a shorter wavelength range such as the visible range.

In another embodiment, the wavelength of the stimulating light energy from the light source is in a shorter wavelength range such as the ultraviolet range while the wavelength of the light output is in a longer wavelength range such as the visible range.

In another embodiment, the radiation sensor is coupled to the light source at one end and to the optical sensor element of the optical detector at another end. The radiation sensor is coupled to the light source and/or the optical detector by means commonly known in the art, such as through a light pipe, a fiber optic plate, or a fiber optic bundle. The optical sensor element comprises a time integrating sensor or array, such as a charge coupled device ("CCD"), a image intensified CCD, a complementary metal oxide semiconductor ("CMOS"), a photodiode or a photomultiplier ("PMT") or a positive-intrinsic-negative "PIN" photodiode.

In yet another embodiment of the present invention, the radiation detection device detects both the presence and the location of a radiation source. The radiation detection device comprises one or more bundles of optical fibers of different lengths, wherein the fibers share a common end position. Each fiber also comprises a radiation sensitive material, such as an OSL material or a TLD material. The radiation sensitive material stores energy when it receives radiation from the radiation source. A stimulating source located at one end of the bundle stimulates the radiation sensitive material wherein the radiation sensitive material releases the stored energy in the form of a light output. The light output provides a readout signal for each fiber, wherein the readout signal corresponds in intensity to the radiation received by each fiber from the radiation source. The intensity of the radiation received by each fiber depends upon the fiber length. An optical detector receives the readout signal, detects variations in intensity of the readout signals from fibers of different lengths, or even bundles of fibers of different lengths, along the length of the bundle or bundles and determines the general location of the radiation source based on the intensity of the readout signals from the fibers or fiber bundles.

In another embodiment, the stimulating source is coupled to the fibers at their common end, wherein the optical detector detects the light output at the same end.

In another embodiment, the stimulating source is coupled to the fibers at their common end, wherein the optical detector detects the light output at the opposite end.

In another embodiment, each fiber comprises a core having an outer wall and an inner wall surrounding a transmission channel, wherein the inner wall is coated with a cladding layer of radiation sensitive material. The cladding layer interacts with a fluorescent dye material located within the core. The fluorescent material absorbs the stimulated light output released from the radiation sensitive material and re-radiates light at a longer wavelength, wherein the re-radiated light is substantially trapped within each fiber and transmitted to the optical detector. The outer wall is coated with a reflective coating, wherein the reflective coating optically isolates each fiber and further redirects the stimulated light output released from the radiation sensitive material back toward the transmission channel and the redirected light output is transmitted to the optical detector.

In another embodiment, each fiber comprises a hollow tube having an outer wall and an inner wall surrounding a transmission channel, wherein the inner wall is coated with a layer of radiation sensitive material and the outer wall is coated with a reflective coating. The reflective coating optically isolates each fiber and redirects the stimulated light output released from the radiation sensitive material back toward the transmission channel and the redirected light output is transmitted to the optical detector. The hollow tube is either comprised of glass or a polymer.

In another embodiment, each fiber comprises a radiation sensitive material having a particular sensitivity to specific radiation energies, wherein each fiber responds selectively to radiation of particular energy or energies.

In another embodiment, the radiation detection device comprises a controller. The optical detector detects a readout signal during a data collection period and the controller controls the timing of the data collection period such that the detection of a readout signal having a radiation energy below a threshold results in extending the data collection period until the optical detector detects a readout signal having a radiation energy above a threshold.

In another embodiment, the optical detector comprises an array of individually readable light detectors, such as a CCD or a CMOS, arranged such that the individually readable light detectors are coupled to each fiber or fiber bundle.

In another embodiment, the radiation detection device detects the presence and the location of a radiation source. The radiation detection device comprises a two-dimensional array of optical fibers arranged in a generally planar fashion. The fibers comprise a radiation sensitive material, such as an OSL or a TLD material, which stores energy when it is exposed to radiation from the radiation source. A stimulating source stimulates the radiation sensitive material, wherein the radiation sensitive material releases the stored energy in the form of a light output. An optical detector images the array of fibers. The imaging detects the areas of the array exposed to radiation, wherein the areas exposed to radiation emit a light output and the areas not exposed to radiation appear darker. The light and dark images produce an image of the radiation source suitable for the identification of the energy and location of the radiation source.

Further objects, features and advantages of this invention will become readily apparent to persons skilled in the art after a review of the following description, with reference to the drawings and claims that are appended to and form a part of this specification.

DETAILED DESCRIPTION

Figure 1:
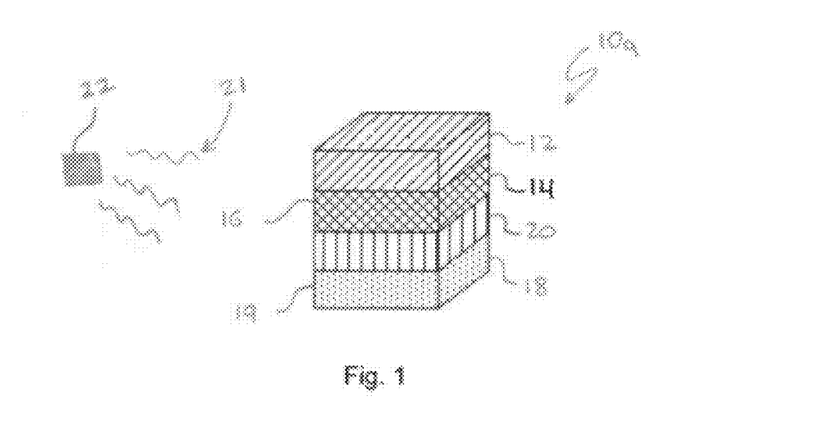
FIG. 1 is a perspective view of a layered structure of one embodiment of a radiation detection device.

FIG. 1 illustrates a radiation detection system 10a, The radiation detection system 10a is a layered structure created by deposition of successive layers. The radiation detection device 10a includes a light source 12 acting as the first layer. A radiation sensor 14 acts as a second layer and includes a radiation sensitive material 16, such as an OSL material. An optical detector 18 act as the fourth layer, while an optical filter 20, interposed between the radiation sensor 14 and the optical detector 18, acts as the third layer.

The optical detector 18 has an optical sensor element 19 for receiving a signal from the radiation sensor 14. The optical detector may comprise a collection of discrete sensor elements, such as a CCD, a image intensified CCD, a CMOS, a PMT or a PIN photodiode, either in a linear array or in a two-dimensional array to span and address a corresponding array of radiation sensor elements. Other types of solid-state optical sensors may also be used within the scope of this invention. The OSL material can also be provided in the form of small crystals comprising a base carrier material doped with one or more crystalline dopant materials whose optical properties constitute radiation sensitive and subsequently stimulation capable elements. A layer comprising such small crystallites may be placed within, or on, an inert binder material in the place of the thin deposited film described above. Radiation specific sensitizers may be added to increase the absorption cross-section or adjust radiation sensitivity of the OSL material.

For readout, the radiation sensitive material 16 is exposed to radiation 21 from a radiation source 22. The radiation sensitive material 16 stores as energy, radiation 21 received from the radiation source 22. The light source 12 provides a stimulating light energy (possibly in the form of a light pulse) in one wavelength range to the radiation sensitive material 16. Thereafter, the energy stored in the radiation sensitive material 16 is released in the form of a light output in a different wavelength range corresponding in intensity to the amount of radiation it has received. The light output provides a readout signal which is used to determine the energy of the radiation 21 from the radiation source 22. The stimulating light energy is prevented from reaching and activating the optical detector 18 by the optical filter 20 interposed between the radiation sensor 14 and the optical detector 18. While operating the light source 12 in the infrared is convenient, the critical factor is that the stimulating light can be blocked from or produced in a wavelength range such that the optical detector 18 is not excited by the output of the light source 12.

The readout signal may include a plurality of readout events. A single readout event may include of one or multiple pulses of the light source 12 with or without time-coincident gating of the optical detector 18. The readout signal may be scheduled to occur at fixed or programmed intervals. Sensitivity is greatly improved over conventional scintillation counter approaches because signal integration is performed directly by the material itself rather than being delivered as a prompt signal with accumulation done electronically based on low level light outputs for individual radiation capture events. The total light output constituting the readout signal arises from the radiation signal integrated over the time period between read-outs, rather than being a prompt signal.

Figure 2:
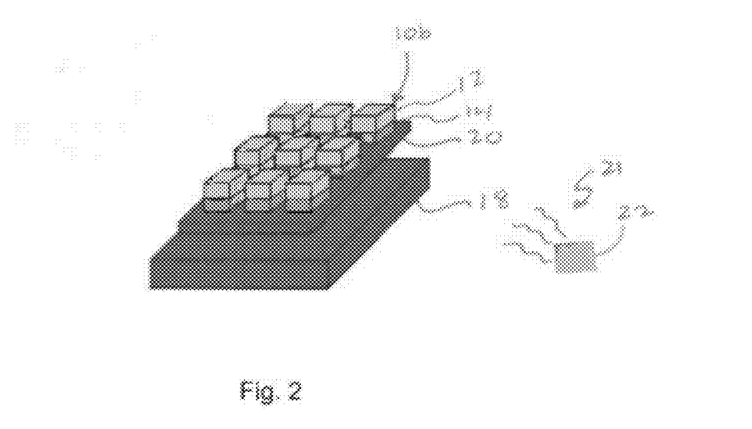
FIG. 2 is a perspective view of the layered structure of the radiation detection device.
Figure 3:
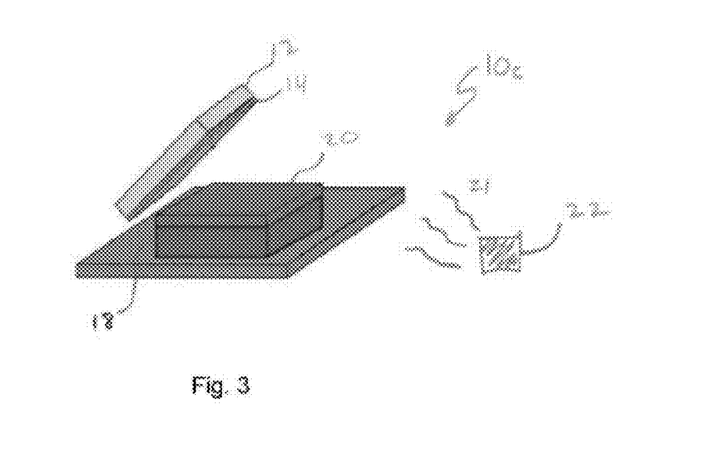
FIG. 3 is a perspective view of the layered structure of a another embodiment of the radiation detection device.

FIG. 2 illustrates another embodiment of the radiation detection device 10b having a layered structure and comprising an array of radiation sensors 14 with a closely coupled array of optical detectors 18. FIG. 3 illustrates another embodiment of the radiation detection device 10c which allows the optical sensor element 19 and the optical detector array 18 to have an unobstructed view of the radiation whose detection is desired. With appropriate shielding from the optical filter 20, the stimulating light is prevented from reaching the optical detector 18.

Referring to FIGS. 2 and 3, the radiation sensor 14 and the optical detector 18 are essentially in contact in a package design. Approximately half of the entire light output, which is generally emitted uniformly in all directions, is available to the optical detector 18. The readout signal level reaching the optical detector 18 is thus higher than for an optical detector such as a photomultiplier tube or discrete photodiode counter whose sensitive elements are located at greater distances from the detector element. This means that the requirements, and thus cost, of the optical signal detection system are lowered.

The radiation detection devices 10a-10c of FIGS. 1-3 are exposed to the radiation source 22 for a period of time generally chosen to meet one of two requirements: 1) the exposure period corresponds to the potential danger limit if the suspected source intensity may be high; 2) if the suspected source to be inspected is not sufficiently intense to present an immediate hazard, the exposure period is chosen to be sufficiently long to accumulate adequate data, in the form of radiation induced electron-hole pairs in the optical detector 18, to allow characterization of the radiation source 22 for the purposes of identification. The ability to modify the test exposure/data accumulation period over a very wide range can be utilized to autonomously adapt the optical detector 18 to the measurements being taken.

The timing of the readout events and their procedure, including the duration of the light pulses, their intensity and their spacing may be specified and varied as needed by programmable software and a digital controller incorporated directly into the integrated detector system. It is also within the scope of this invention for the digital controller and its associated software to accept the data from the radiation detection devices 10a-10c as feedback for active, responsive control of the readout spacing. Under such adaptive control, upon first entry of the radiation detection devices 10a-10c into an area with unknown radiation hazard the readout rate may be set to a short interval, as for example a few seconds. If the sensed radiation level is low or below threshold in that short data collection period, the data collection period would be programmed to lengthen in a series of stages until exposure for the time period gives adequate data for a well characterized level. Lengthening the exposure time and thus the energy expenditure in reading out the data can extend battery life for portable devices. Further, adaptive timing can, in the presence of a higher than expected radiation level, shorten the exposure/data collection time in order to prevent saturation of the sensing system and allow an accurate reading to be achieved. Detection of the full-scale reading with a given exposure period would then trigger a reduction in the exposure time for subsequent measurements. An alarm indication would be provided as a hazard warning in such cases as indicated by standard exposure limitation requirements.

While physically intimate contact between the basic elements of the radiation detection devices 10a-10c are generally useful, many of the same advantages can be obtained within the scope of this invention by interposing a light pipe, fiber optic face-plate, or a tapered or non-tapered fiber bundle between the light source 12 and the radiation sensor 14 requiring optical stimulation. Possible utility may be gained if packaging, in particular designs, can be enhanced by this means to allow changes in the relative physical orientation of the light source 12 and the radiation sensor 14. Additional enhancements may incorporate an array of small lenses coupled to each detector element or a self-focusing array to enable improvements in light throughput and/or to minimize crosstalk between channels. In addition, a tapered fiber optic faceplate may allow for substantially more independent OSL channels allowing for enhancements in time domain of the radiation data.

The integrated design of the radiation detection devices 10a-10c of FIGS. 1-3 is compact, easily packaged, rugged, inexpensive, efficient in data readout, and can be operated for long periods on low power. By comparison with conventional systems, the approach with the radiation sensor 14 essentially in contact with the optical detector 18, the radiation sensitive material 16 transmits to the optical detector 18 a much larger fraction of the released light output than is possible with conventional photomultiplier tube or discrete light detector systems simply due to the larger mutual solid angle subtended by the sensor and detector.

Figure 4:
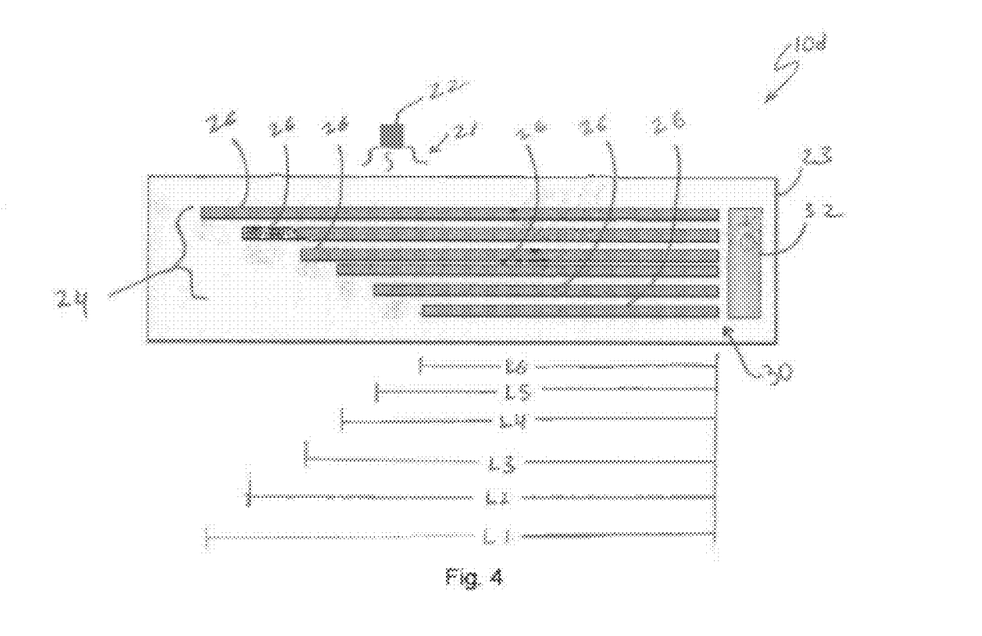
FIG. 4 is a schematic diagram of another embodiment of the radiation detection device having an optical fiber bundle.

FIG. 4 illustrates another embodiment of a radiation detection device 10d, wherein the radiation detection device 10d detects the presence and the spatial location of a radiation source 22 inside a container 23. The radiation detection device 10d comprises one or more 24 of optical fibers 26 of different lengths L1-L6 (L1 being the longest while L6 is the shortest), wherein the fibers share a common end 30. It should be understood that the optical fibers 26 may represent more than one individual optical fiber. To put it another way, the optical fibers 26 may represent a sub bundle of fibers located within the bundle 24. For simplicity's sake, this disclosure will refer to the optical fiber or sub bundles of optical fibers simply as "optical fibers 26." Each of the optical fibers 26 comprise a radiation sensitive material, such as an OSL or a TLD material. The radiation sensitive material stores energy when it receives radiation from the radiation source 22. At least one stimulating source 32 located at the common end 30 of the optical fibers 26 stimulates the radiation sensitive material wherein the radiation sensitive material releases the stored energy in the form of a light output. The light output provides a readout signal for each fiber 26, wherein the readout signal corresponds in intensity to the radiation received by each fiber 26 or bundle from the radiation source 22. The intensity of the radiation received by each fiber 26 or bundle depends upon the fiber length. At least one optical detector, located at the common end 30 of the fibers 26, receives the readout signal, detects variations in intensity of the readout signals from fibers of different lengths within the bundle 24 and determines the general location of the radiation source 22 based on the intensity of the readout signals.

It is desired not only to detect nuclear radiation in a container 23, but to locate the source 22 spatially. This may be accomplished by placing a bundle 24 of fibers 26 having, according to this invention, sensitized fibers 26 of different lengths therein, along one or more sides of the container 23. If the container 23 has within it a localized source 22 of nuclear radiation, because the fibers 26 within the bundle(s) 24 are chosen to have different lengths, there will be regions of space along the length of the bundle for which some fibers 26 will not receive the full intensity of the nuclear radiation and hence will provide a reduced or no detection signal. When the fibers 26 are interrogated by optical or thermal stimulation as described above, examination of the signals will indicate which fibers 26 received radiation and hence where the source 22 is located along the bundle 24. If the detector fiber bundle 24 of this invention is in or on, for example, an intermodal shipping container, the placement of a localized source 22 can be identified along the direction of the fiber bundle 24. Placement of additional fiber bundles 24 orthogonally can serve to locate the source in 2 or 3 dimensions. Because fiber optic bundles 24 are inexpensive, wide deployment can be more cost effective than discrete sensors.

As with other radiation detection devices and data storage systems, the ability to ensure the reliability of such detectors can, in principle, be compromised by enemy action as, for example, by resetting the radiation sensitive materials by exposing them to sufficient light or heat, thus leading the investigator to conclude that there was no, or little, nuclear radioactive material present. To avoid this it is desirable to incorporate a modification comprising incorporation, in close proximity to one or more of the sensitized elements, a low intensity, localized, radiation source which produces, in these same sensitized elements radiation damage in the form appropriate for reading out by optical or thermal stimulation, a consistent, minimum signal, below the saturation level of the sensitized elements and independent of radiation exposure from external sources. The integrated detector, as a matter of normal practice, records the elapsed time since official resetting and thus the signal recorded from the low intensity source should, in the absence of tampering, have a known minimum value. If the readout value from these same elements is significantly smaller than this expected value, an inappropriate reset has occurred and an alert notification can readily be processed. Additionally, the actual readout values of the sensor elements monitoring the standard source contains the information as to when the reset occurred. In the case of the container 23, this would, together with a known itinerary of the container 23, locate the place where it occurred.

Thus in practice of this invention, it is desirable to incorporate, with the sensor, a known, small, low level gamma or beta source that provides a known background data level that is small enough not to interfere with a signal level that would indicate a serious problem. The presence of this signal must be observed or the investigator will conclude that an erasure has been made and the shipment must be physically inspected.

A second approach is to incorporate both sensitized sensor materials and the low intensity source in a "paint" that can be applied, as one example of an application, to the surface of the container 23. If the container 23 contains nuclear radioactive materials, the gamma radiation will interact with the paint to produce a latent dose measurement which can later be queried by exposing the paint (containing the now excited electron hole pairs) to either heat or light of an appropriate wavelength depending on the choice of detector materials, either OSL or TLD. The queried material then emits light from such pairs as they recombine and the amount of light emitted indicates the strength of the gamma source. If a number of 'patches' or 'stripes' of this sort are placed on the container, the approximate location of the source 22 may also be determined in a manner similar to that of the doped optical fiber detector system described herein. Portable devices suitable for querying the data 'stored' in such detector 'paint' surfaces can be assembled from components of moderate sensitivity because the intensity of the stimulated light emission, in consideration of the rapid read out of time integrated stored data, is higher than for prompt reading detectors such as solid or liquid state scintillation or Geiger-Muller counters. Imaging detectors of the general type used in digital cameras are suitable for the purpose.

The excited state half-lives, in the absence of external stimulation, of the different suitable detector materials of the OSL and particularly the TLD types useful for the present invention are known to vary widely. The use of materials of different, un-stimulated, half life is important as it provides temporal information as to when the radiation source first interacted with the paint. Reading out the radiation dose from a long half-life material gives one the total dose received. Knowing the half life for the shorter life materials and reading them out identifies when the exposure occurred and whether it was from the beginning of the testing period (originating port for example) or at a later time (and hence a different, but, considering the container itinerary, definable port). Use of several materials having different time lines gives enough data to determine the history.

In one implementation, the subject invention utilizes one or more bundles of dosimetrically doped optically stimulated luminescent (OSL) fibers of different lengths which are queried from one end of the bundle 24 using a pulsed light source 32 which illuminates the fibers 26 and an imaging detection mechanism reading the secondary light emission from the fibers 26 either at the same or at the opposite end of the bundle 24. The detection system imaging the ends of the fibers 26 records the emission intensity and/or wavelength from the individual fibers 26 or bundles 24.

As can be seen in FIG. 4, the source 22 will most strongly impinge upon the longer fibers 26 (lengths L1-L4) and to a lesser extent upon the shorter fibers 26 (lengths L5-L6). The subsequently detected signal from the latter fibers will thus be of lower intensity than for the former set.

Figure 5A:
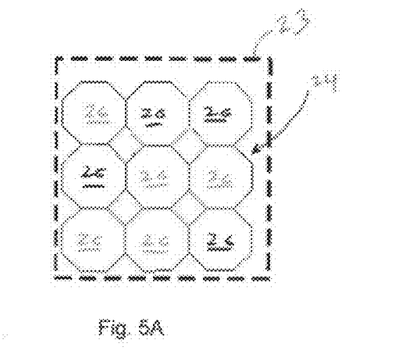
FIGS. 5A and 5B are schematic diagrams of end and side views of the optical fiber bundle of the radiation detection device of FIG. 4.
Figure 5B:
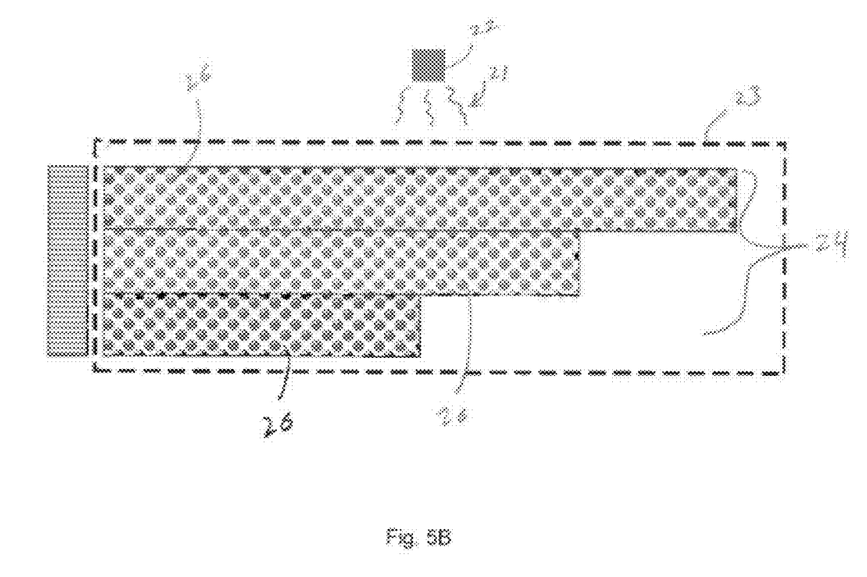

Referring to FIGS. 5a-5b, another configuration of the fiber 26 is shown. It is noted that FIG. 5a shows the fibers 26 from a front view, while FIG. 5b shows the fiber 26 from a side view. As shown in FIGS. 5a-5b, the fibers 26 in the bundle 24 can be arranged 'in depth' against a container wall 23 or the surface of another object of interest.

Figure 6:
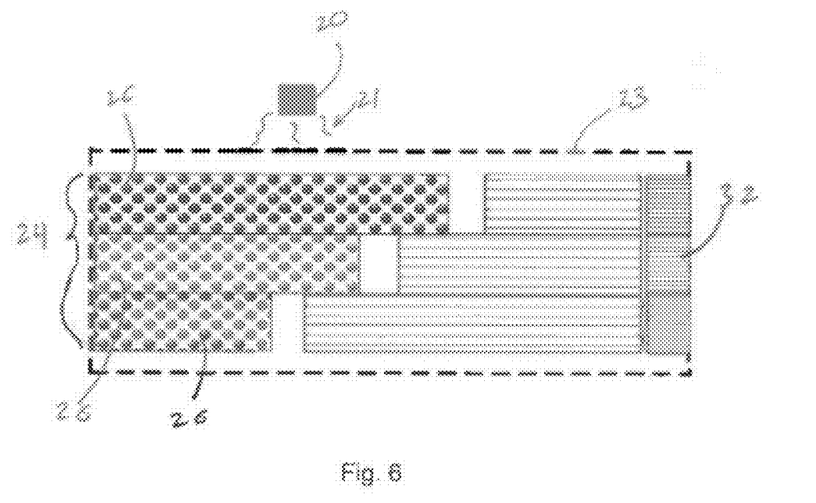
FIG. 6 is a schematic diagram of another embodiment of the optical fiber bundle of the radiation detection device.

When the examined object emits nuclear radiation detectable by the OSL dopant in the fiber bundle 24, the signal is read out by inserting an optical pulse at the end as shown in FIG. 4. Because the stimulated light emission is chosen to differ in wavelength from the incident stimulating light, the detector may be protected from the stimulating radiation by suitable optical filters 20 known in the art. Alternatively, the stimulated emission is delayed relative to the stimulating source pulse 32 to permit the two signals to be separated by electronic gating of the optical detector elements 18 without the need for the filter(s) 20. The stimulation source 32 and the detector may be located at the common end 30 site of the fibers 26 as indicated in FIGS. 4, or at opposite ends of the fiber 26 as shown in FIG. 6. For fibers 26 in which the OSL or TLD material is placed as a dopant within the whole body of the fiber, the concentration of the dopant materials must be chosen such that attenuation or scattering of the emitted signal radiation along the length of fiber required to survey the object of interest due to the dopant presence does not unacceptably deteriorate the received signal at the optical detector.

Optical fibers 26, including glassy but more particularly polymer-based optical fibers 26 may be doped with a wide variety of optically active materials. In the present invention such fibers 26 are doped with a radiation sensitive material 16, such as an OSL material, at concentrations such that optical transmission of the emission spectrum of the radiation sensitive materials 16 down the length of the fibers 26 is maintained at a known level, sufficient to allow intensity measurements when the radiation sensitive material 16 is queried with a light pulse. Because there is some overlap in the optical emission and absorption spectra of the radiation sensitive materials 16, transmission attenuation of the transmitted intensity will occur. The distance over which such transmission levels must be maintained will depend both on the length of fiber 26 required to collect data over the extent of the object(s) to be examined and the concentration of the active detection chemicals in the fiber 26. For internally doped fibers 26 and in the case of conventional intermodal shipping containers 23 said distance may be limited to 20 to 60 feet for the longest fibers 26 in the bundle 24 by the choice of radiation sensitive materials 16 and concentrations. Detailed values for the attenuation coefficients may be obtained for the fibers 26 of a bundle 24 by calibration using known radiation sources 22 and these incorporated into the readout computation on a fiber 26 by fiber 26 basis if desired for higher resolution.

In specific designs for detection systems employing the principles of the present invention it may be desirable to utilize subsets of doped fiber bundles 24 in which the active, sensitive elements of separate bundles 24 are chosen to respond most sensitively to the radiation from particular isotopes of interest. This will allow determination of the type of radiation as well as its location within a container. If an emphasis on reducing false alarms due to detection of radiation from known benign sources such as, by example, ceramic tiles, bananas etc. is desired, one or more fiber bundles 24 may be doped so as to respond to the specific radiation energies associated with the benign sources it is desired to account for. Detection of enhanced signals from such specifically selected fiber dopants at the same location as found by the more general detection fibers 26 would allow for selection against false alarms due to benign sources. Common commercial imaging sensors such as those used in consumer digital cameras can easily accommodate separate detection of a large number of identifiable fibers or subsets of doped fiber bundles, each directing optical signals to one or more of the pixels of a two-dimensional CCD or CMOS imaging array.

The arrangement described above can, with modifications that will suggest themselves, be used to incorporate and interrogate radiation sensitive materials 16, such as TLD materials or OSL materials described here. While TLD materials often have shorter un-stimulated half-lives than most common OSL materials, this property can be utilized to establish timing of an exposure as discussed above. While direct optical stimulation is feasible, it may under particular circumstances, be preferable to use TLD materials whose stimulation can also be provided by heating due to the light provided by LEDs or other light sources.

Referring back to FIG. 4, the fiber bundles 24 most convenient for implementing the present invention, consist of "coherent" fibers such that the physical arrangement of the fibers 26 within the bundle 24 is maintained through and at both ends of the bundle 24. Such coherent optical fiber bundles 24 are used in optical borescopes and some other remote inspection devices requiring image transfer, fiber optic data transmission lines and other applications. The use of coherent bundles 24 allows the radiation detection data from each fiber 26 or appropriate group of fibers 26 to be collected and identified separately. In one particular case, the fibers 26 will have different lengths and thus allow, as described above, for the location of the radiation source 22 by noting which fibers 26 were most heavily irradiated and the locations of their radiation sensitive materials 16. Longitudinal location of nuclear radiation sources 22 may be done with a single fiber system. If 2 or 3 dimensional information with respect to a container is desired, orthogonal fiber systems may be utilized and the 3-D image resolved in software or electronic hardware.

While coherent fiber bundles 24 are a most straightforward way to implement the invention, they are somewhat expensive. Another approach, in keeping with this invention is to use a simple, incoherent fiber bundle 24 and calibrate it so that the correlation between fiber position and the 2-D location at the end of the bundle 24 can be deduced. In this context, calibration consists of exposing the ends of the fiber bundle 24 to a matrix of light sources 12 coupled to the individual fibers 26 and recording the particular imaging sensor elements 19 to which each fiber 26 corresponds. Since the length of each fiber 26 and its position as seen by the imaging sensor are then known, analysis of the radiation source 22 input location may then be made easily with a simple correlation table. Such tables are known in the art and can be implemented, for example, using programmable gate arrays.

Figure 7:
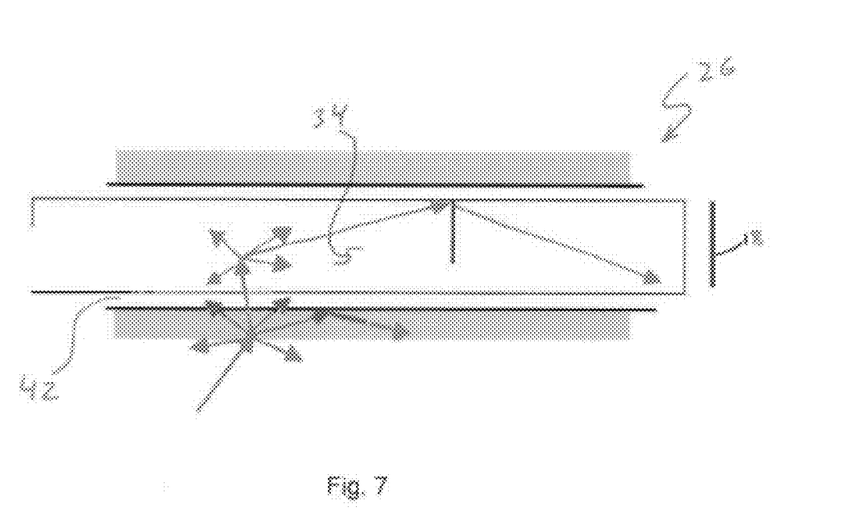
FIG. 7 is a schematic diagram of an optical fiber for use with a radiation detection device.

Referring to FIG. 7, the OSL (or TLD) material of the fiber 26 is excited by nuclear radiation and enters a trapping state in which quasi-stable electron hole pairs are created and their numbers increase over time as the nuclear radiation dose is integrated over time. When the dose is to be read, the OSL material is probed with the appropriate optical stimulation source, preferably in the infrared ("IR") region of the spectrum (0.7-1.1 micron) and emits shorter wave length visible photons corresponding to the dose received. These photons are radiated approximately isotropically with a fraction passing through the doped or cladding layer 42 and eventually interacting with a fluorescent dye molecule in core 34 of one of the fibers 26, for example, but not by limitation, rhodamine6G-R6G, Rhodamine-B or Coumarin-8 embedded in the core 34 material chosen from one or more classes of optically transparent materials such as a glass or Polymethyl Methacrylate ("PMMA"). In operation, the fluorescent dye molecules absorb the short wavelength OSL emission radiation and re-radiate lower energy/longer wavelength light essentially isotropically, with a significant fraction (approximately 70% for glass fibers in air) being confined to one of the fibers 26 by total internal reflection ("TIR") and transmitted down one of the fibers 26 with little loss. By this means it is possible to transmit a significantly larger fraction of the emitted OSL radiation to the detector 18.

Figure 8A:
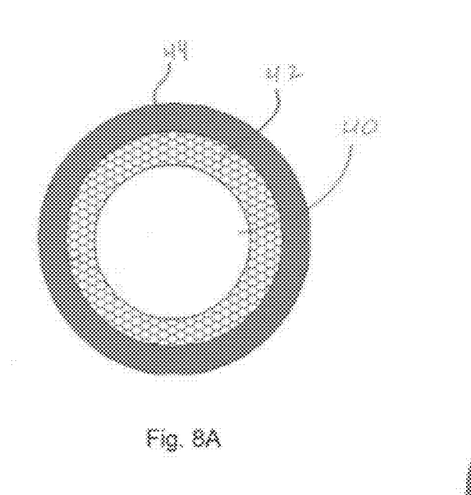
FIGS. 8a-8c are cross-sections of different embodiments of an optical fiber.
Figure 8B:
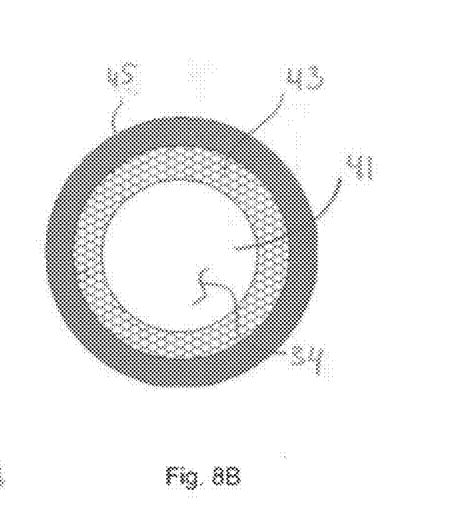
Figure 8C:
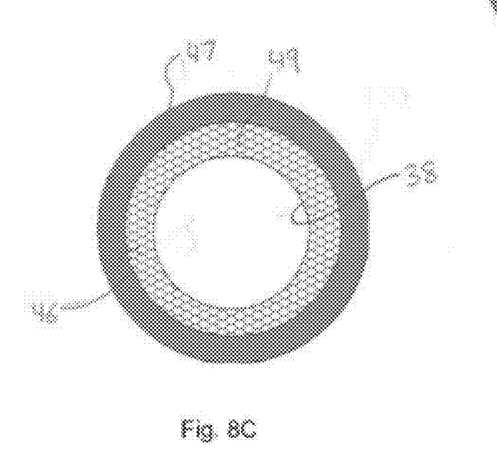

Referring to FIGS. 8A-8C, a cross section of one of the fibers 26 is shown. As noted above, the internal doping of the entire inside of the optical fibers 26 with OSL materials presents an attenuation mechanism for transmission of the light emitted by the detecting OSL or TLD materials and this may limit the practical, useful length of the fiber bundles 24. Referring to FIG. 8A, the fiber includes an optical fiber core 40, surrounded by an OSL (or TLD) doped cladding layer 42, further surrounded by a reflective coating 44.

An alternative method utilizes fibers prepared as in FIG. 8B in which the transmission channel 41, is essentially clear. A surrounding OSL (or TLD) cladding layer 43 is doped with the active sensor material and is made to have an index of refraction lower than that of the transmission channel 41. An outer coating 45 is a reflective coating which optically isolates the fiber from its neighbors and redirects externally directed emission from the OSL (or TLD) cladding layer 43 back toward the transmission channel 40. With composite fibers of this type, the radiation detection signal is obtained in the OSL (or TLD) cladding layer 43 deposited on the outer wall of the optical fiber but established in optically intimate optical contact with said fiber during manufacture. Transmission of the radiation responding emitted signal can proceed down the clear central core 41 with low attenuation thus permitting greater useful detector lengths. It may be seen that a composite fiber containing the OSL (or TLD) material as a doped region outside of a clear central core as in FIG. 8B, can function as indicated above for a coated fiber. Stimulated light emission from the OSL cladding layer 43 will be largely inserted into the clear fiber and transmitted to the image sensor at its end with little attenuation beyond that occasioned by frustrated TIR in the OSL coating itself. Properly designed, this attenuation effect is minimal. The stimulating light source 32 may be coupled directly to the clear fiber core 34 and through the established intimate optical contact, coupled with the OSL cladding layer 43. Decoupling of the signals in adjacent fibers 26 or fiber bundles 24 may also be accomplished by the usual methods utilized in the optical fiber communication industry.

Alternatively, the fiber, as shown schematically in FIG. 8C, may comprise a hollow tube 46 of glass or a polymer on the interior wall 38 of which is disposed a layer of OSL (or TLD) material. The exterior of the tube 46 may be coated with a reflective layer 47 to redirect the outward-directed portion of the readout emitted light back into the tube interior along which it is guided to the optical sensors 18 as with the other designs described herein. The OSL cladding layer 49 may be applied to the interior wall 38 of hollow tube 46 by filling the tube 46 with a slurry solution of the OSL material and pouring it out or by allowing the excess to drip out, followed by drying and baking at a temperature suitable to promote adhesion to the wall. Alternatively, sol-gel processes may be employed as is known in the art. Approaches to establishing layers of phosphors on the interior of glass tubes are well known in the manufacture of fluorescent light bulbs. Such methods are easily controlled in current practice.

In the case of the hollow tube 46 design of FIG. 8C, the light stimulation can be provided by several means, including, but not by limitation, insertion of an intense light beam into the tube 46 either by flash tube or laser, or by electronic or microwave excitation of a plasma discharge light source within the tube as can occur in fluorescent light bulbs. If desired, it is possible to excite individual tubes selectively by means similar to those used for plasma television displays. Addressing subsets of fibers for stimulation allows for independent measurements to be made and use of the resulting redundancy capability to enhance reliability and sensitivity.

Another possible approach to enhancing the signal to noise ratio of the detector of this invention is to employ within the fluorescent dye doped fibers, a distributed feedback internal 'grating' comprising a repeated, regular, index of refraction variation along the length of the fiber in such a manner as to cause lasing action to take place when sufficient light emitted from the OSL sensor material impinges upon the fiber following optical stimulation. When lasing action occurs the coherent light transmitted down the fiber 26 can be focused by lens or other means to as small as a diffraction limited 'spot' at the detector/imager whether said detector/imager is of CCD or CMOS type. The resulting much higher intensity spot provides a much higher signal to background noise ratio thus simplifying and making less expensive, the detection process and hardware by reducing the relative effect of background light.

The fibers 26 may be coated with, or separated from each other, by material particularly chosen to attenuate nuclear radiation in general or of particular energies. Such choices provide, in the readout of the light emission from a bundle 24, an indication of the direction of the source 22 as well as its strength, energy and longitudinal position. Digital processing of the signal from individual fibers 26 or bundles 24 of fibers of similar lengths, can be accomplished with techniques well known in image processing software for adjusting contrast, resolution and brightness in digital images.

Figure 9:
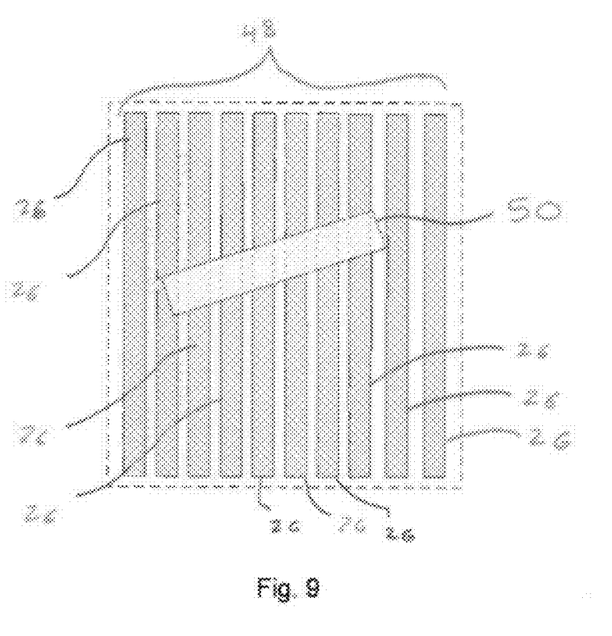
FIG. 9 is a schematic diagram of another embodiment of the radiation detection device which employs an array of fibers or tubes.

Referring to FIG. 9, another alternative embodiment employs an array 48 of fibers 26 or tubes arranged in a near planar fashion. Each of the fibers/tubes is generally as described in the previous teachings of this invention and comprises a mechanical substrate coated on the interior or exterior surface(s) with an OSL or TLD layer suitable for electronic, light or plasma discharge stimulation. After the 2-D array 48 of tubes/fibers is exposed to the nuclear radiation such that the OSL material collects the radiation data over a period of time as electron-hole pairs are excited, the reading of said collected data is accomplished by stimulating the OSL material in all of the array tubes. The emission of light from the recombination is then examined by imaging the array 48 surface with a conventional instrument such as, by example but not by limitation, a CMOS or CCD digital camera sensor. Irradiated areas 50 of the array 48 which have been exposed to nuclear radiation will emit light appropriately and those which have not been so exposed will be observed to be darker. This produces an image of the source suitable for its identification and location.

The use of different OSL sensor materials having particular sensitivity to nuclear radiation of particular types and energies may be incorporated into separate tubes such that different tubes respond selectively to radiation of different energies. The use of a 2-D imaging sensor permits identification of the specific responses and thus identification of the nuclear radiation sources as well as their location. Current technology now exists to prepare a pixilated array of plasma excitable elements which can then give higher resolution images of the irradiated region(s). In practice such arrays 48 are operated by first exposing them to the possible radiation source(s) for an appropriate time depending on the expected or relevant source intensity, followed by stimulation of the entire array 48 and imaging of the resultant light emission. The resultant image delineates the dose and its intensity as a function of position thus locating the source. Use of two or more such arrays 48 arranged orthogonally allows 3-D location of sources within their area coverage.

The 2-D arrays 48 described are also sensitive to X-ray radiation and the storage aspects of the dosimetric fibers/tubes disclosed permit enhanced signal to noise levels in imaging as called for in X-Ray examinations. The ability to do this allows lower dosages for patients in medical service or otherwise sensitive objects in other diagnostic scenarios.

As a person skilled in the art will readily appreciate, the above description is meant as an illustration of implementation of the principles of this invention. This description is not intended to limit the scope or application of this invention in that the invention is susceptible to modification, variation and change, without departing from spirit of this invention, as defined in the following claims.

The invention claimed is:

1. A radiation detection system for detecting the presence and location of a radiation source, the radiation detection device comprising:
   at least one bundle of optical fibers, the optical fibers having different lengths, each fiber of the at least one bundle having a first end and second end, wherein the first ends share a common longitudinal location and the location of the second ends is determined by the length of each fiber, wherein each optical fiber is configured to experience different doses of radiation from a localized source, wherein shorter optical fibers are configured to received less exposure to radiation than longer optical fibers;
   wherein each fiber comprises a radiation sensitive material, wherein the radiation sensitive material stores energy when it receives radiation from the radiation source;
   at least one stimulating source for supplying stimulation to the radiation sensitive material, wherein the radiation sensitive material releases the stored energy corresponding to the radiation sensitive material's received radiation dose as a light output when it is exposed to the stimulating source, the light output providing a readout signal for each fiber, wherein the readout signal corresponds in intensity to the radiation received by each fiber from the radiation source, wherein the total energy of the radiation dose received by each fiber depends upon the fiber length;
   at least one optical detector for receiving the readout signal, wherein the at least one optical detector is configured to detect variations in intensity of the readout signals along the length of the bundle and determine the general location of the radiation source based on the intensity of the readout signal from different fibers of the bundle having different lengths exposed to the radiation source.

2. The radiation detection system of claim 1, wherein the radiation sensitive material is an optically stimulated luminescent material.

3. The radiation detection system of claim 1, wherein the radiation sensitive material is a thermal luminescent detector material.

4. The radiation detection system of claim 1, wherein the at least one stimulating source is coupled to the first ends of the bundle of optical fibers, wherein the at least one optical detector detects the light output at said first ends.

5. The radiation detection system of claim 1, wherein the at least one stimulating source is coupled to the first ends of the bundle of optical fibers, wherein the at least one optical detector detects the light output at the second ends.

6. The radiation detection system of claim 1, wherein each fiber comprises a core having an outer wall and an inner wall surrounding a transmission channel, wherein the inner wall is coated with a cladding layer of radiation sensitive material.

7. The radiation detection system of claim 6, wherein the cladding layer interacts with a fluorescent dye material located within the core, wherein the fluorescent material absorbs a portion of the stimulated light output released from the radiation sensitive material and re-radiates light at a longer wavelength, wherein the re-radiated light is substantially trapped within each fiber and transmitted along the fiber to the at least one optical detector.

8. The radiation detection system of claim 6, wherein the outer wall is coated with a reflective coating, wherein the reflective coating optically isolates each fiber and redirects a portion of the stimulated light output released from the radiation sensitive material back toward the transmission channel, wherein the redirected light output is transmitted to the at least one optical detector.

9. The radiation detection system of claim 1, wherein each fiber comprises a hollow tube having an outer wall and an inner wall surrounding a transmission channel, wherein the inner wall is coated with a layer of radiation sensitive material, wherein the outer wall is coated with a reflective coating, wherein the reflective coating optically isolates each fiber and redirects the stimulated light output released from the radiation sensitive material back toward the transmission channel, wherein the redirected light output is transmitted to the at least one optical detector.

* * * * *